Figure 5:
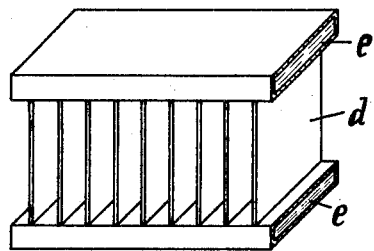

H. JUNKERS.
TURBO COMPRESSOR.
APPLICATION FILED JUNE 13, 1911.
1,088,585.  Patented Feb. 24, 1914.
3 SHEETS—SHEET 1.
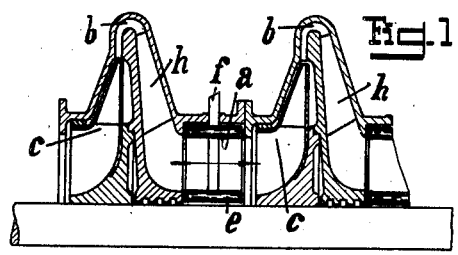
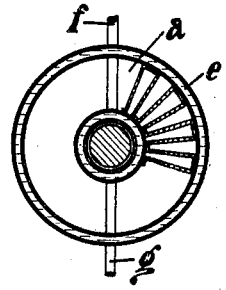
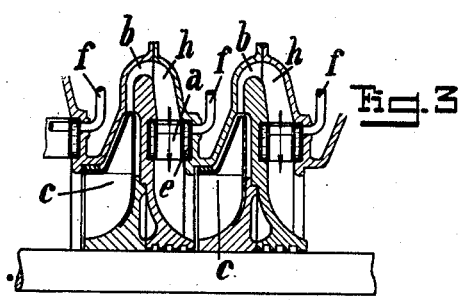
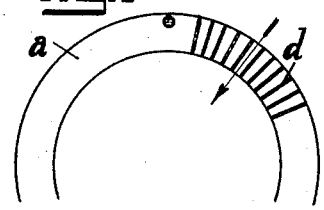
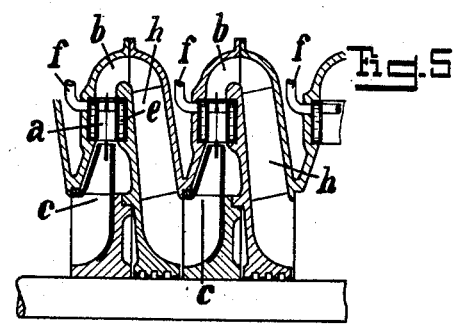
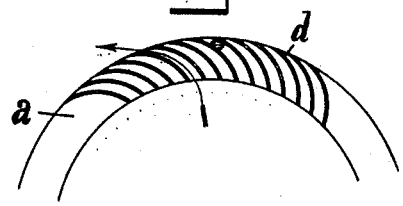
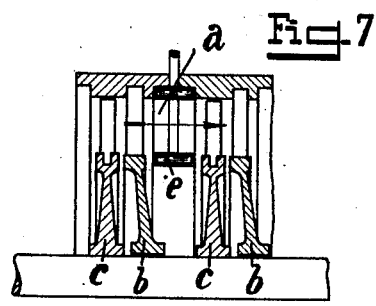
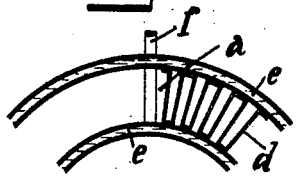
Witnesses:
J. L. Hughes
M. Gray
Inventor:
Hugo Junkers
per
Attorney

H. JUNKERS.
TURBO COMPRESSOR.
APPLICATION FILED JUNE 13, 1911.

1,088,585.

Patented Feb. 24, 1914.
3 SHEETS—SHEET 2.

Witnesses:
J. L. Hughes
M. Gray

Inventor:
Hugo Junkers
per
Attorney

H. JUNKERS.
TURBO COMPRESSOR.
APPLICATION FILED JUNE 13, 1911.
1,088,585.
Patented Feb. 24, 1914.
3 SHEETS—SHEET 3.
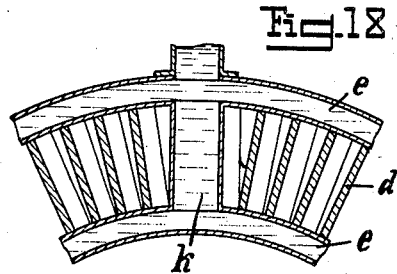
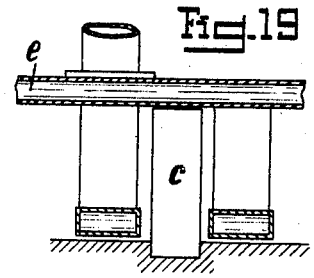
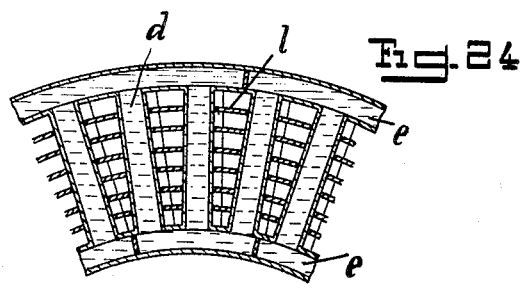
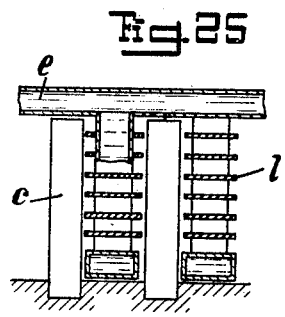
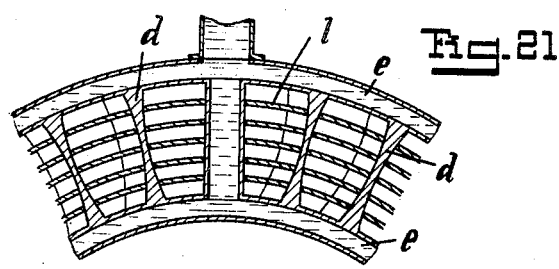
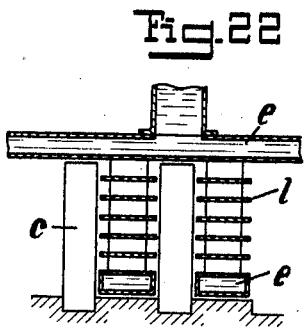
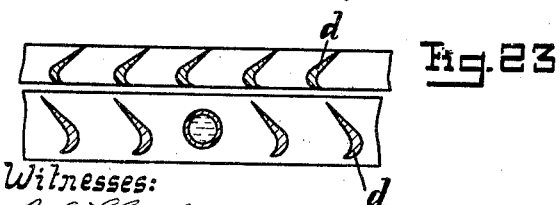
Witnesses:
J. L. Hughes
M. Gray
Inventor:
Hugo Junkers
per
Jm Muiie Attorney

UNITED STATES PATENT OFFICE.

HUGO JUNKERS, OF AIX-LA-CHAPELLE, GERMANY.

TURBO-COMPRESSOR.

1,088,585.   Specification of Letters Patent.   Patented Feb. 24, 1914.

Application filed June 13, 1913. Serial No. 632,941.

*To all whom it may concern:*

Be it known that I, HUGO JUNKERS, a subject of the King of Prussia, residing at No. 68 Bismarckstrasse, Aix-la-Chapelle, in the Kingdom of Prussia, Empire of Germany, have invented certain new and useful Improvements in Turbo-Compressors; and I do hereby declare the following to be a full, clear, and exact description of the invention, such as will enable others skilled in the art to which it appertains to make and use the same.

My present invention relates to turbo-compressors and in particular to the cooling-devices used in connection with such machines. The devices of this kind hitherto employed for obtaining an approximately isothermal compression were placed outside the walls of the turbine casing, whereby the dimensions of the whole structure of such engines were unavoidably increased. The resistance of the gases resulting from friction on the walls of the conduits, change of the direction of the gases, etc., caused considerable losses of energy and a working of the engines in question in such economical manner as made possible by the use of this proposed device has probably never been known before. Owing to the above mentioned disadvantages a restricted number of cooling-devices could only be employed— especially for multi-stage-turbines—and for this reason an isothermal compression has never even approximately been obtained by these compressors, and the energy gained by the cooling-devices represented only a very small amount. According to the present invention these drawbacks are avoided by the use of so called indirect cooling-surfaces which are inserted in the channels provided for the passage of the gases in the interior of the turbine and arranged in such a manner that the gases passing with great velocity through the turbine are sliced up into layers. Favorable conditions are thus created for the transmission of heat and at the same time a very large cooling-surface can be lodged in the turbine itself without perceptibly enlarging the casing of the turbine. The indirect cooling-surfaces consist of thin and good heat conducting cooling-plates which can be straight or curved as circumstances may require. The edges of the cooling-plates are preferably wedge-shaped in order to offer less resistance to the flow of the gases. The form of the cooling-plates is so chosen that it is made possible to arrange a large cooling-surface in a comparatively small space and to keep the passages formed by the cooling-plates which are placed side by side, of short length, thus opposing but little resistance to the flow of the surrounding gases. This permits inserting the cooling-devices in the interior of the turbine in several stages or every one of the same without causing great difficulty as to the construction of the pump. The cooling-channels for the cooling-medium are kept very short and simple and pipe-couplings are, as far as possible, dispensed with. Another advantage gained by the arrangement described consists therein that the cooling-plates may be adapted to suit the method of working of the different turbine-types avoiding thereby injurious losses resulting from change of the direction of the gases, whirls, increase of resistances, etc. For the reason that the cooling-devices are placed in the casing of the turbine the great differences in the cross sectional areas of the gas-passages, as for instance shown by nearly all types of cooling-devices now in use do not occur by the use of the present invention. The great velocity of the gases passing through the different stages of the turbine can thus easily be maintained and may therefore be used to improve the transmission of heat, as the latter depends on the velocity of the gases.

Other objects and advantages will be fully explained in the following description and the invention will be more particularly pointed out in the claims.

Reference is had to the accompanying drawings which form a part of this application.

Similar characters of references are used to indicate the same parts throughout the several views.

Figure 10:
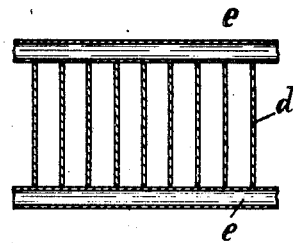
Figure 13:
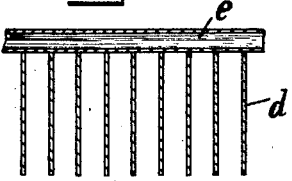
Figure 11:
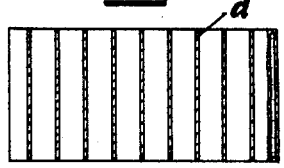
Figures 14, 15:
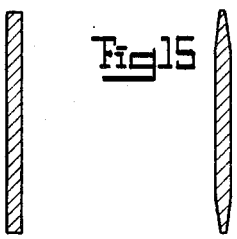
Figure 12:
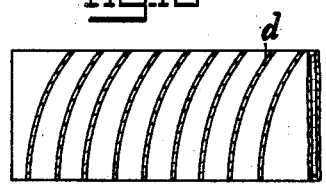
Figure 16:
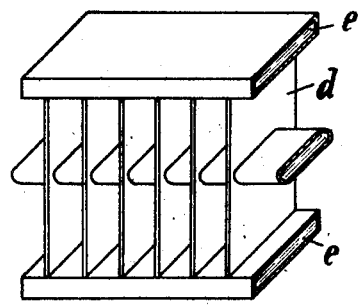
Figure 17:
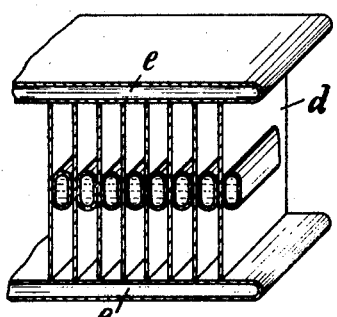

Figure 1 represents a part of a longitudinal sectional view of a centrifugal compressor; the cooling-device *a* being mounted in the interior of the turbine. Fig. 2 is a cross sectional view of the device shown in Fig. 1. The radially arranged cooling-plates *d* are connected on both sides with the cooling-channels *e* for the reception of the cooling-medium which is supplied to the cooling-channels *e* by a feeding-pipe *f* and drawn off by another pipe *g*. Fig. 3 shows the cooling-device lodged in a so called diffuser *h* of a compressor. The cooling-plates are radially arranged to the axis of the turbine. Fig. 4 is an end view of the cooling-device represented in Fig. 3. Figs. 5 and 6 illustrate an annular cooling-device placed around the circumference of the rotor c. According to the inclined directions of the gases escaping from the rotor the cooling-plates are curved in order to avoid injurious shocks. Figs. 7 and 8 show the cooling-device fitted between the stages of an axial-flow-compressor. Fig. 9 is a perspective detail view of a series of cooling-plates d; the same being in contact on both sides with the cooling-channels e for the cooling-medium. Fig. 10 is a vertical sectional view of the object shown in Fig. 9. Fig. 11 is a horizontal sectional view taken on Fig. 9 (straight cooling-plates). Fig. 12 is a similar view as represented in Fig. 11 (curved cooling-plates). Fig. 13 shows a series of cooling-plates conductively secured to one cooling-channel. Fig. 14 is a cooling-plate of rectangular cross section. Fig. 15 is a cooling-plate wedge-shaped in front and at rear. Fig. 16 is a perspective detail view similar to Fig. 9 with a middle conduit for the cooling-medium. Fig. 17 shows supplementary cooling-pipes arranged between the cooling-plates and in intimate contact with the latter. Fig. 18 is a detail vertical section of a cooling device for an axial flow compressor. Fig. 19 is a detail section taken through one of the cooling channels. Fig. 20 is a detail horizontal section taken through Fig. 18. Fig. 21 is a detail vertical section illustrating a series of secondary cooling plates. Fig. 22 is a detail transverse section of the same. Fig. 23 is a detail horizontal section taken through Fig. 21. Fig. 24 is a detail vertical section of a modified form of the invention. Fig. 25 is a detail transverse section of the same. Fig. 26 is a detail horizontal section taken through Fig. 24.

The construction of a turbine of this kind is much simplified by constructing the cooling-device in such a manner that the cooling-plates replace the blades of the stator. In order to carry out this construction the blades are made of good heat conducting material and connected to the annular cooling-channels e. Different methods of uniting the cooling-channels with the cooling-plates may be employed, as for instance by casting or by means of galvanoplastic methods and by soldering them together.

In Figs. 18, 19 and 20 I show a part of a cooling-device as mentioned before for an axial-flow-compressor. The cooling-plates d are connected on two edges with the walls of the cooling-channels and form at the same time the blades of the stator. An inlet and outlet for the cooling-medium and from the inner channel is effected by a few tubes or hollow blades k. The heat of the surrounding gases is absorbed by the cooling-plates, forming in this case the blades of the stator, and is conducted to the walls of the cooling-channels whence it enters into the cooling-medium. The space between the blades may be used for the reception of a series of secondary cooling-plates, as shown in Figs. 21, 22, and 23. The solid blades $l$ of the axial-flow-turbine are in conductive connection with the cooling-plates $d$ which are placed in parallel line to the direction of the gases to be compressed and represent the main cooling-surfaces. The cooling-plates $l$ may be regarded as secondary ones, taking up the heat of the gases and communicating it to the blades $d$ which are secured to the channels wherethrough the cooling-fluid passes. Answering to the intensity of the flow of the heat the cross sectional area of the blades or cooling-plates may gradually be increased to the spots where they are soldered or otherwise connected with the cooling-channels. The most favorable cooling effect, however, would be obtained if any or all of the blades are formed with hollow spaces for the passage of the cooling-fluid and connected with each other by a series of secondary cooling-plates.

In Figs. 24, 25 and 26 I illustrate a somewhat modified form of the arrangement represented in the foregoing three figures. Referring to Fig. 24 and following $l$ designates a series of cooling-plates of annular form and $d$ are hollow blades for the reception of the cooling-fluid communicating with the surrounding cooling-channels $e$. The heat absorbed by the cooling-plates is thus directly transferred to the blades $d$ and thence to the cooling-medium.

I claim:—

1. In a turbo-compressor, the combination of a rotor with a stator and a cooling-device manufactured independently of the compressor and additionally inserted in the gas-passages of said compressor, said cooling-device being fitted to the form of the gas-channels of said compressor and consisting of a series of thin, heat conducting plates, said plates being placed side by side and leaving small spaces for the passage of the gases to be compressed, and said heat conducting plates being conductively connected with the walls of cooling-channels.

2. In a turbo-compressor, the combination of a rotor with a stator and a cooling-device formed independently of the compressor and additionally inserted in the gas-passages, said cooling-device being fitted to the form of the compressor and consisting of a series of thin, heat conducting plates, said plates being placed side by side and leaving small spaces for the passage of the gases to be compressed, said heat conducting plates conductively secured on both edges lying in the direction of the flow of the gases to the walls of cooling-channels.

3. In a turbo-compressor, the combination of a rotor with a stator and a cooling-device formed independently of the compressor and additionally inserted in the gas-passages, said cooling-device being fitted to the form of the gas-channels of this compressor and consisting of a series of thin, heat conducting plates, said plates being placed side by side and leaving small spaces for the passage of the gases to be compressed, and said heat conducting plates being secured to the walls of a cooling-channel.

4. In a turbo-compressor, the combination of a rotor with a stator and a cooling-device formed independently of the compressor and additionally inserted in the gas-passages, said cooling-device being fitted to the form of the gas-channels of the compressor and consisting of a series of thin, heat conducting plates, said plates being constructed in such a manner as to conduct these gases in a certain way and to make the arrangement of a special conducting-device dispensable, said heat conducting plates conductively connected with the walls of cooling-channels.

5. In a turbo-compressor, the combination of a rotor with a stator and a cooling-device mounted in the space formed between the blades of the stator, said cooling-device consisting of heat conducting plates, said plates being arranged parallelly to each other and leaving small spaces for the passage of the gases to be compressed, said heat conducting plates being arranged parallel to the flow of gases to prevent deflection of said gases, but to act as coolers, said heat conducting plates being secured to the walls of the blades of the stator, said walls being cooled by the fluid.

6. In a turbo-compressor, the combination of a rotor with a stator and a cooling-device mounted in the space formed between the blades of the stator, said cooling-device consisting of heat conducting plates, said plates being arranged parallelly to each other leaving small spaces for the passage of the gases to be compressed, these heat conducting plates being arranged so as to be unconnected with the task of the blades for conducting the gases in a certain way, but only act coolingly, said heat conducting plates being secured to the blades of the stator which latter are conductively connected with the walls of cooling-channels.

In testimony whereof I have signed my name to this specification in the presence of two subscribing witnesses.

HUGO JUNKERS.

Witnesses:
 HENRY QUADFLIEG,
 MATHIEU GILLES.